United States Patent [19]

Amagasa

[11] Patent Number: 4,750,077
[45] Date of Patent: Jun. 7, 1988

[54] COIL DEVICE
[75] Inventor: Nobutada Amagasa, Kobe, Japan
[73] Assignee: Mitsubishi Denki Kabushiki Kaisha, Tokyo, Japan
[21] Appl. No.: 816,957
[22] Filed: Jan. 6, 1986

Related U.S. Application Data

[62] Division of Ser. No. 583,421, Feb. 24, 1984, abandoned.

[30] Foreign Application Priority Data

Mar. 1, 1983 [JP] Japan ................... 58-35145
Mar. 2, 1983 [JP] Japan ................... 58-35287
Apr. 25, 1983 [JP] Japan ................... 58-74252

[51] Int. Cl.$^4$ .............................................. H02H 7/08
[52] U.S. Cl. ....................................... 361/18; 361/91; 336/70; 310/72
[58] Field of Search ................. 310/72, 194, 169, 208; 336/69, 70, 83, 177, 209, 222, 223; 323/355; 361/18, 21, 35, 38, 86, 91

[56] References Cited

U.S. PATENT DOCUMENTS

| | | | |
|---|---|---|---|
| 999,749 | 8/1911 | Chubb | 336/223 X |
| 999,893 | 8/1911 | Skinner | 336/209 X |
| 2,521,536 | 9/1950 | Reardon | 336/177 X |
| 2,761,094 | 8/1956 | Frampton | 336/222 X |
| 2,788,500 | 4/1957 | Gunderson | 336/222 X |
| 3,554,797 | 1/1971 | Coerver, Jr. et al. | 336/83 X |
| 3,611,032 | 10/1971 | Skillicorn | 361/35 |
| 3,686,523 | 8/1972 | Gorden et al. | 310/72 |
| 3,765,082 | 10/1973 | Zyetz | 336/83 X |
| 3,812,442 | 5/1974 | Muckelroy | 336/83 |
| 3,833,872 | 9/1974 | Marcus et al. | 336/83 |
| 4,211,944 | 7/1980 | Haller | 310/72 |
| 4,376,904 | 3/1983 | Horrigan | 336/209 X |

FOREIGN PATENT DOCUMENTS 717157 8/1965 Canada ...................... 336/177

*Primary Examiner*—Philip H. Leung
*Assistant Examiner*—Derek S. Jennings
*Attorney, Agent, or Firm*—Wenderoth, Lind & Ponack

[57] ABSTRACT

The distributed capacitance between coil turns in a coil device is increased, and a coil inductance and a low-pass filter are formed, whereby overvoltages and high frequency voltages are suppressed. The increased distributed capacitance is attained by inserting a ferroelectric insulator, such as a ceramic material, between the coil turns or by winding a metal foil-containing insulator film in the shape of a tape, round a coil conductor.

13 Claims, 2 Drawing Sheets

COIL DEVICE

This application is a division of now abandoned application Ser. No. 583,421, filed Feb. 24, 1984.

BACKGROUND OF THE INVENTION

This invention relates to a coil device, and more particularly to improvements in an induction coil for use in a dynamo electric machine or a protection circuit against overvoltages in a semiconductor rectifier circuit.

In general, in the rectifier circuit of the brushless exciter of an A.C. generator of large capacity, respective arms of semiconductor rectifier elements such as diodes or thyristors have heretofore been provided with snubber circuits in order to suppress commutation surges to the semiconductor rectifier elements and to partially allot the reverse voltage of the rectifier circuit, which is induced in the field coil of the generator during the asynchronous operation of the generator or the like, to the plus and minus arms. In this case, the induced field coil voltage, which is applied as the reverse voltage to the rectifier circuit when a field current is blocked by the semiconductor rectifier element, gives rise to a resonant phenomenon between the leakage inductance of the field coil and a capacitance existent in the rectifier circuit (or an associated circuit). Therefore, as the capacity of the generator becomes larger, the withstand voltage performance of the rectifier circuit must be enhanced. Accordingly, the snubber circuits which include voltage dividing capacitors for partially allotting the reverse voltage to the plus and minus arms have been indispensable as stated above.

The provision of such snubber circuits has led to the problem that, since the number of components increases, the reliability of the entire equipment degrades, and the problem that, since more enhanced performances are required of the respective elements of the snubber circuits with the increase of the capacity of the equipment, the price of the equipment rises, and besides, the size of the equipment becomes large inevitably.

Accordingly, the use of the snubber circuits in the rectifier circuit as described above is undesirable. In a case where, for example, a load connected to the rectifier circuit has a coil, the snubber circuits can be dispensed with in such a way that a low-pass filter for suppressing overvoltages is formed by utilizing the leakage inductance and distributed capacitance of the coil.

On the other hand, with the progress of semiconductor products in recent years, commutation surges and switching surges have become liable to frequently occur in the power source and load of a dynamo electric machine. Therefore, the dielectric strength requirements of the components of the dynamo electric machine have become more severe. By way of example, in the field circuit of the dynamo electric machine, a field circuit breaker is operated during the detection of a fault such as a short-circuit, so as to disconnect the field circuit. On account of a surge voltage which develops with the generation of an arc current and the dissipation of energy in a field coil when the circuit breaker has operated, excess withstand voltages are required of circuit elements. For this reason, an arrester such as a selenium arrester for overvoltages has been used.

In addition, the dynamo electric machine involves a high frequency voltage generated within itself. It has therefore been necessary to separately dispose an L-C low-pass filter as means for suppressing the high frequency voltage. The provision of the arrester and the low-pass filter circuit in the dynamo electric machine has led to the large size of the whole equipment and the increased cost thereof.

Also in this case, when a substantial low-pass filter is formed by the inductance and distributed capacitance of the field coil in the field circuit, the surge voltage and the high frequency voltage can be suppressed.

Besides, various coil devices for overcurrent suppression have been used, such as an A.C. reactor for suppressing fault currents or mutual interference between common voltage sources, an induction reactor assembled in a thyristor Leonard system, and an arc extinguishing reactor. Particularly in recent installations of large sizes and large capacities, the prior art coil devices have little economic merits.

Meanwhile, U.S. Pat. No. 3,686,523 issued to D. I. Gorden et al. on Aug. 22, 1972 teaches a technique wherein a flexible capacitive tape is disposed between the coil terminals of a dynomo electric machine or between the terminal and neutral point thereof so as to protect a rectifier device from overvoltages. This measure does not comprise improvements in the coil itself, and has disadvantages similar to those described above.

SUMMARY OF THE INVENTION

It is accordingly an object of the present invention to provide a coil device in which a low-pass filter for suppressing overvoltage surges and high frequency voltages is formed by utilizing an inductance and a distributed capacitance.

In order to accomplish the above mentioned object, the coil device according to the present invention comprises means to increase the distributed capacitance, between coil turns. This coil device is best suited to a coil of large capacity for use in a dynomo electric machine. Preferably, the means to increase the distributed capacity is a ferroelectric insulator, an insulating film containing metal foil, or a metal deposition film. The insulator should desirably be made of a ceramic material which is inserted in the whole space or partial space between the coil turns. The metal foil-containing film should desirably have at least its part formed in the shape of a tape or sheet and wound on a coil proper.

When such a coil device is applied to the field coil of the dynamo electric machine, etc., a substantial low-pass filter can be formed having increased distributed capacitance and coil inductance, and surge voltages and high frequency voltages ca be suppressed.

BRIEF DESCRIPTION OF THE DRAWINGS

The present invention will become more apparent by reference to preferred embodiments illustrated in the accompanying drawings in which.

In the drawings, the same symbols indicate the same or corresponding parts.

DETAILED DESCRIPTION OF THE INVENTION

Figure 1:
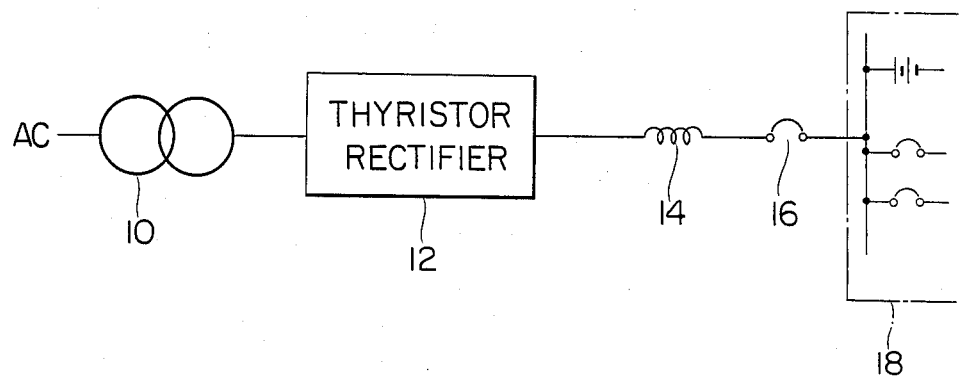
FIG. 1 is a schematic circuit diagram showing a general D.C. power source equipment to which a coil device of the present invention is applicable.

FIG. 1 is a schematic circuit diagram showing a hitherto-known D.C. power source equipment to which a coil device according to the present invention is applied. A transformer 10, a thyristor rectifier device 12, a coil device 14, a circuit breaker 16 and a load device 18 are connected in series as shown in the figure, wherein alternating current is converted into direct current, which is fed to the load device 18.

Figure 2:
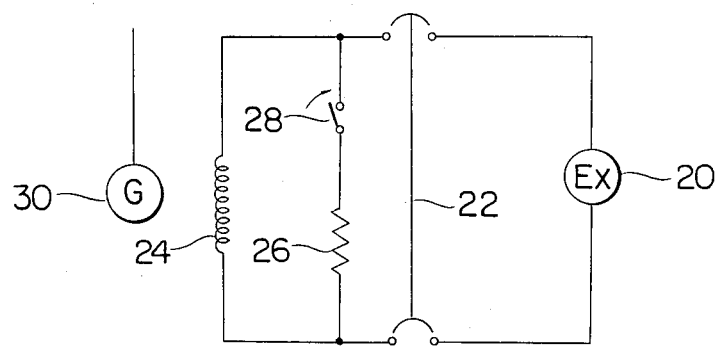
FIG. 2 is a diagram of the field circuit of a general dynamo electric machine to which the coil device of the present invention is applicable.

FIG. 2 shows the field circuit of a hithertoknown dynamo electric machine to which the coil device according to the present invention is applied. A coil device 24 is connected across a D.C. power source 20 through a field circuit breaker 22, and the series combination consisting of a discharging resistor 26 and a switch 28. The coil device 24 is a field coil, which is combined with an armature coil 30. In this circuit arrangement, as already stated, when any fault has arisen, the circuit breaker 22 operates to interrupt a field current, and simultaneously, the switch 28 is closed to dissipate current energy stored in the inductance of the field coil 24, through the discharging resistor 26.

Figure 3:
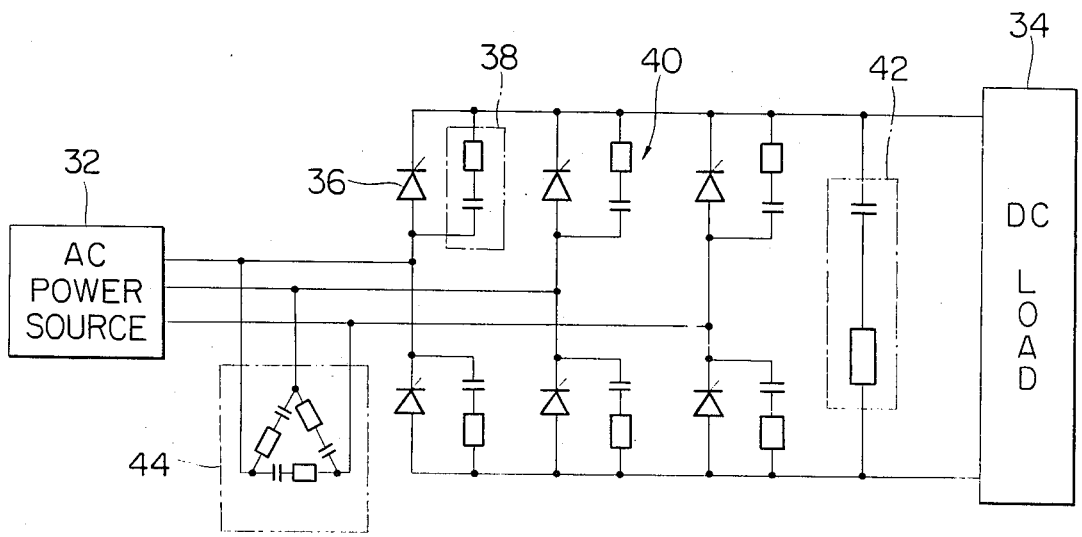
FIG. 3 is a circuit diagram showing a general electrical apparatus which employs a semiconductor rectifier circuit including snumbber circuits.

FIG. 3 is a circuit diagram showing a hithertoknown electrical apparatus which employs a semiconductor rectifier circuit. A rectifier circuit 40, each arm of which includes a parallel circuit consisting of a thyristor 36 and a CR snubber circuit 38, is disposed between a three-phase A.C. power source 32 and a D.C. load 34 to which the coil device according to the present invention is applicable. Another snubber circuit 42 is connected in parallel with the D.C. load 34. Further, a snubber circuit 44 for three phases is disposed between the rectifier circuit 40 and the power source 32. Owing to such arrangement, as already stated, the snubber circuits function to protect the thyristors 36 from overvoltage commutation surges.

With the prior art coils, accordingly, the protection against overvoltages requires to separately dispose protection devices such as low-pass filters in the cases of FIGS. 1 and 2 and to dispose the large number of snubber circuits in the case of FIG. 3.

The present invention can suppress overvoltage surges and high frequency voltages without especially disposing the protection devices or the snubber circuits, by means of the coil device to be described below.

First, the principle of the coil device according to the present invention will be elucidated.

In general, the capacitance C per unit area between coil turns is expressed by the following equation:

$$C = \frac{1}{\delta} \cdot \epsilon_o \cdot \epsilon_s \quad [F]$$

where
$\delta$: the thickness of an insulator between the coil turns,
$\epsilon_o$: the permittivity of the free space,
$\epsilon_s$: the relative permittivity of the insulator between the coil turns.

In order to increase the capacitance C in the above equation, the thickness $\delta$ of the insulator may be decreased and a substance of great relative permittivity $\epsilon_s$ may be employed as the insulator.

In the design of equipment, however, there is a physical limitation to the gap between the coil turns. Accordingly, the insulator of high relative permittivity $\epsilon_s$ may be selected and have its thickness $\delta$ decreased to the utmost.

Figure 4:
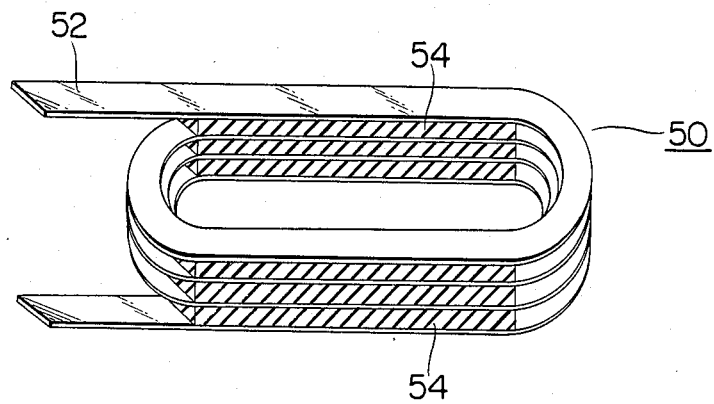
FIG. 4 is a perspective view showing an embodiment of the coil device according to the present invention.

FIG. 4 shows a preferred embodiment of the coil device according to the present invention. An insulator 54 is packed between the respectively adjacent coil turns of a coil conductor 52 in a coil device 50.

While an epoxy resin (relative permittivity: 4.58-8) is usually employed as the insulator, a melamine resin is effective for a low frequency region on the order of 100 Hz and natural mica (relative permittivity: 8.5-11) is used for a problematic high frequency region near 100 kHz. The cut-off frequency of a low-pass filter is required under some circuit conditions, and a still greater distributed capacitance is obtained with a ferroelectric ceramic material whose relative permittivity is 1000 or above.

In this way, the insulator 54 can fulfill both functions as means to suppress surge voltages and means to suppress high frequency voltages.

Figure 5:
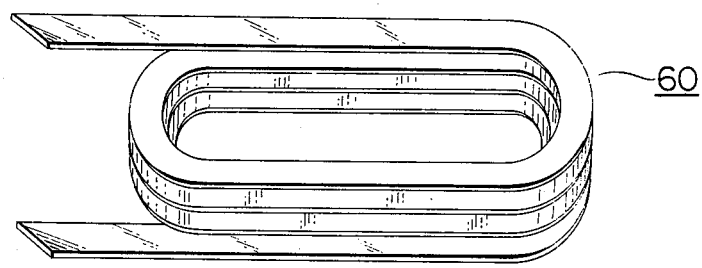
FIG. 5 is a perspective view showing another embodiment of the coil device according to the present invention.

FIG. 5 is a perspective view which shows another embodiment of the coil device according to the present invention. In this coil device 60, the spaces between the respectively adjacent coil turns of a coil conductor 62 of copper are vacant, but a polyimide film 64 which is several tens $\mu$m thick is wound round the coil conductor 62 as seen from a partial detailed view of FIG. 6. This measure is an effective means for filling the gaps between the coil turns, and can increase the distributed capacitance between the coil turns as in the embodiment of FIG. 4. A metal foil 64a is contained in the polyimide film 64, thereby to achieve the increase of the distributed capacitance.

Although the metal foil-containing polyimide film 64 has a relative permittivity of 2-4 or so, it affords a high capacitance C because it is very thin. This film 64 is wound round the coil conductor 62 while forming a plurality of layers. Since, however, the film 64 need not be a single tape continuous over the whole coil conductor 62 or the contained metal foil need not be directly in contact with the coil conductor 62, the metal foil constitutes a separate circuit for increasing the distributed capacitance. That is, the film 64 functions as an insulator and also makes the capacitor forming circuit as a dielectric. Accordingly, the film 64 in FIG. 6 achieves the surge voltage and high frequency voltage suppressing functions as the insulation means similarly to the insulator 54 in FIG. 4.

In the embodiment of FIGS. 4 or 5, the insulator 54 or the film 64 may be inserted partly or entirely in the space between the coil turns. However, it should desirably extend over a plurality of spaces between the coil turns. That is, a plurality of divided parts of the insulator 54 or the film 64 may be disposed on the coil conductor 62.

Figure 6:
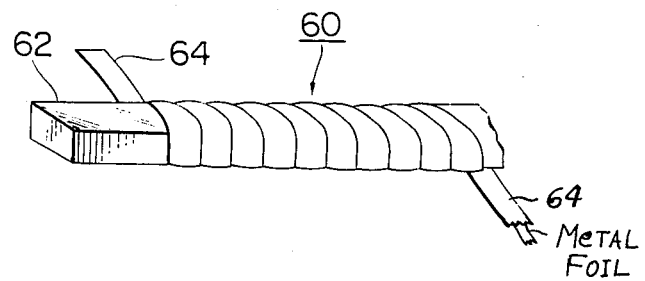
FIG. 6 is a perspective view showing a part of the coil device of 5 on an enlarged scale.

In the embodiment illustrated in FIGS. 5 and 6, the example in which the metal foil-containing film in the form of the tape is wound on the conductor of the induction coil has been explained as the member for producing the high distributed capacitance, which is the means for increasing the distributed capacitance between the coil turns. However, the film need not be restricted to the tape form, but a metal foil-containing film in the form of a sheet or a bell mouth may well be partly disposed. Besides, a metal deposition film may well be applied as the member for producing the high distributed capacitance. Further, even when a part of the induction coil is replaced with a coil whose surface is made of an insulating oxide, effects similar to those of the embodiment can be achieved.

Figure 7:
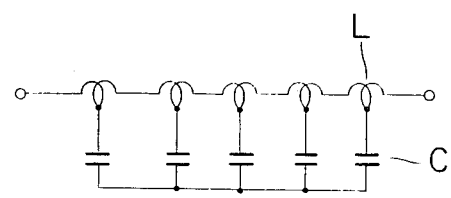
FIG. 7 is an equivalent circuit diagram of the coil device according to the present invention.

An equivalent circuit of the coil device of the embodiment of the present invention illustrated in FIG. 4 or FIGS. 5 and 6 is shown in FIG. 7 (in which L denotes an inductance, and C a capacitance). As understood from this equivalent circuit, the coil device of the present invention can reduce high frequency voltages by forming a low-pass filter (cut-off frequency $$f = \frac{1}{2\pi \sqrt{LC}}).$$

The embodiments are applicable to a case where a circuit breaker is included in an A.C. circuit and a case where the distributed capacitance of the field coil of a brushless generator is increased to form a low-pass filter. Besides, the distributed capacitance of the armature of an A.C. exciter or the coil of a transformer may be increased to form a low-pass filter.

Also, when all the snubber circuits in the rectifier circuit hitherto used are not removed but small-sized and inexpensive snubber circuits of low performance are used conjointly with the aforementioned low-pass filter, considerable effects can be attained.

The above description is merely exemplary, and the present invention is applicable to any coil which fits the purpose that the coil itself is endowed with a frequency characteristic, whereby the reduction of surge voltages etc. is achieved while the original function is maintained.

In addition, in a coil whose coil turns are in close contact, the present invention can be constructed in such a way that, as means for increasing the distributed capacitance between the coil turns, an insulator having a high relative permittivity is used as the insulator with which the surface of the coil conductor is coated.

As set forth above, according to the coil device of the present invention, the distributed capacitance between the coil turns of the coil device is increased to endow the coil device with a frequency characteristic. With the addition of a slight cost, this brings forth the effect that a surge voltage resulting from the storage of energy produced by the existence of an inductance can be efficiently reduced and the effect that a high frequency voltage can be suppressed. Similtaneously therewith, a switching circuit, for example, need not be furnished with any special protection device, with the result that equipment can be rendered small in size and that inexpensive equipment is obtained while increasing the capacity of the equipment.

It will be obvious to those skilled in the art that the present invention is not limited to the specific apparatus disclosed, but can include various modifications without departing from the spirit of the present invention. What is clamed is:

1. A dynamo electric machine, comprising:
   a field induction coil means including a coil having spaces between the coil turns thereof,
   a power supply circuit including semiconductor elements for supplying electrical power to said coil,
   switching means for disconnectably electrically connecting said coil and said circuit, and
   means in said coil means for absorbing overvoltage generated when current in said circuit is abruptly varied by activation of said switching means, whereby said semiconductor elements in said circuit are protected from the overvoltage, said overvoltage absorbing means being constituted by a low-pass filter formed of the inductance of said coil and ferromagnetic insulator inserted in said spaces between said coil turns so as to increase the distributed capacitance between said coil turns.

2. A dynamo electric machine according to claim 1, wherein said insulator is a ceramic material which is inserted in said spaces between said coil turns.

3. A dynamo electric machine according to claim 1, wherein said insulator is an insulating film which contains a metal foil.

4. A dynamo electric machine according to claim 3, wherein the metal foil-containing film has at least a part thereof formed in the shape of a tape, which is wound on said coil.

5. A dynamo electric machine according to claim 3, wherein the metal foil-containing film has at least a part thereof formed in the shape of a sheet.

6. A dynamo electric machine according to claim 1, wherein said insulator is a metal deposition film.

7. A dynamo electric machine according to claim 1, wherein said switching means is a rectifying circuit for converting an A.C. power to a D.C. power to be supplied to said field coil.

8. An electrical power supply circuit, comprising:
   a coil means including a coil having spaces between the coil turns thereof,
   a rectifying circuit including semiconductor elements for converting A.C. power to D.C. power and supplying said D.C. power to said coil; and
   means in said coil means for absorbing overvoltage generated in said power supply circuit when current in said supply circuit is abruptly varied, whereby said power supply circuit protected from the overvoltage, said overvoltage absorbing means being consituted by a low-pass filter formed of the inductance of said coil and ferromagnetic insulator inserted in said spaces between said coil turns so as to increase the distributed capacitance between said coil turns.

9. A circuit as in claim 8, wherein said insulator is a ceramic material which is inserted in said spaces between said coil turns.

10. A circuit as in claim 8, wherein said insulator is an insulating film which contains a metal foil.

11. A circuit as in claim 10, wherein the metal foil-containing film has at least a part thereof formed in the shape of a tape, which is would on said coil.

12. A circuit as in claim 10, wherein the metal foil-containing film has at least a part thereof formed in the shape of a sheet.

13. A circuit as in claim 8, wherein said insulator is a metal deposition film.

* * * * *